350-96.1 SR CROSS REFERENCE SEARCH RO
XR 3,254,557

READING HEAD HAVING A PLURALITY OF GROUPS OF OPTICALLY ISOLATED TRANSPARENT LAMINAE

Filed May 14, 1962 5 Sheets-Sheet 1

Inventors
David George Brake
Derek John Ball
by Roberts, Cushman & Grover
Attorneys

3254557
OR IN 356/169

| n | R | ℓ | S |
|---|---|---|---|
| 2 | p | $\frac{p}{2}$ | NONE |
| 3 | p | $\frac{p}{3}$ | NONE |
| 3 | 2p | $\frac{2p}{3}$ | NONE |
| 3 | 2p | $\frac{p}{2}$ | $\frac{p}{6}$ |
| 4 | p | $\frac{p}{4}$ | NONE |
| 4 | 3p | $\frac{3p}{4}$ | NONE |

Fig. 11b.

| n | R | ℓ | s | |
|---|---|---|---|---|
| 4 | 3p | $\frac{p}{2}$ | $\frac{p}{4}$ | 1 4 3 2 |
| 4 | 5p | $\frac{p}{2}$ | $\frac{p}{4}$ | 1 3 2 4 3 1 4 2<br>SPACERS BETWEEN EVERY 2nd LAMINATION<br>2 LAMINATIONS OF EACH PHASE IN R |
| 4 | 7p | $\frac{p}{2}$ | $\frac{p}{4}$ | 1 3 1 4 2 4 3 1 3 2 4 2<br>SPACERS BETWEEN EVERY 3rd LAMINATION<br>3 LAMINATIONS OF EACH PHASE IN R |
| 4 | 9p | $\frac{p}{2}$ | $\frac{p}{4}$ | 1 3 1 3 2 4 2 4 3 1 3 1 4 2 4 2<br>SPACERS BETWEEN EVERY 4th LAMINATION<br>4 LAMINATIONS OF EACH PHASE IN R |
| 5 | p | $\frac{p}{5}$ | NONE | 1 2 3 4 5 |
| 5 | 2p | $\frac{2p}{5}$ | NONE | 1 3 5 2 4 |
| 5 | 3p | $\frac{3p}{5}$ | NONE | 1 4 2 5 3 |

Fig. 11c.

| n | R | ℓ | s | |
|---|---|---|---|---|
| 5 | 3P | P/2 | P/10 | 1 4 2 5 3 |
| 10 | P | P/10 | NONE | 1 2 3 4 5 6 7 8 9 10 |
| 10 | 3P | 3P/10 | NONE | 1 4 7 10 3 6 9 2 5 8 |
| 10 | 7P | 7P/10 | NONE | 1 8 5 2 9 6 3 10 7 4 |
| 10 | 7P | P/2 | P/5 | 1 8 5 2 9 6 3 10 7 4 |
| 10 | 11P | P/2 | P/10 | 1 6 2 7 3 8 4 9 5 10 6 1 7 2 8 3 9 4 10 5<br>SPACERS BETWEEN EVERY 2nd LAMINATION<br>2 LAMINATIONS OF EACH PHASE IN R |
| 10 | 5P | 2P/5 | P/2 | 1 5 9 3 7 6 10 4 8 2<br>SPACERS BETWEEN EVERY 5th LAMINATION |

3,254,557

READING HEAD HAVING A PLURALITY OF GROUPS OF OPTICALLY ISOLATED TRANSPARENT LAMINAE

David George Brake, Langley, and Derek John Ball, Maidenhead, England, assignors to Technicolor Limited, West Drayton, Middlesex, England, a British company Filed May 14, 1962, Ser. No. 194,548
Claims priority, application Great Britain, May 23, 1961, 18,632/61
16 Claims. (Cl. 88—1)

This invention relates to measuring apparatus for accurately measuring the relative movement of two objects of the kind comprising a divided scale that is fixed with respect to one of the objects and a reading head that is fixed with respect to the other of the objects and that comprises a plurality of reading elements that extend over and cooperate with a plurality of the divisions of the scale so that a degree of averaging out of any errors of pitch of the scale is attained. The scales of such measuring apparatus may be light reflecting or light transmissive and are usually very finely divided by substantially uniformly pitched relatively non-reflecting or relatively non-transmissive lines or bands. The scales of such measuring apparatus are frequently rectilinear, and for convenience the invention will be described in connection with such rectilinear scales. It will be understood, however, that the invention is also applicable to circular or spiral scales extending in one or more convolutions over a flat or cylindrical surface, in which cases the reading elements that are presented to the scale lie in a surface similar to that containing the scale. However, by considering the linear development of such curved scales, the application of the present invention to them will be apparent.

For convenience the pitch of the scale divisions of a scale will, in the following description be regarded as 360° of spatial phase difference, and references to phase, phase bands and phase difference should be understood in this sense.

The principal object of the invention is to provide an improved construction of reading head that is relatively cheap and easy to manufacture, that is compact and that is adaptable to various slightly different applications. Other objects that may be realized in connection with specific applications will appear later.

According to the present invention, a reading head for measuring apparatus of the kind set forth comprises a stack of parallel sided but optically isolated transparent solid laminae, each such lamina having in its peripheral surface at least one first light-transmitting area (hereinafter called a "window") for juxtaposition to the scale (or juxtaposition to an optically formed real image thereof) of the measuring apparatus so as to transmit light to or to receive it from the scale, and having in its periphery at least one other, second, window to receive light from the scale and to transmit it externally or to receive light from an external source and to transmit it to the scale, the remainder of the peripheral surface and the adjacent sides of each such lamina being such or so treated as substantially to prevent the emergence or admission of light otherwise than through the windows.

It will be appreciated that, like most optical systems, the system is completely reversible, by which is meant that the source of light and the means of utilizing the light may be interchanged in position relative to the optical elements of the light transmission channel or channels interconnecting them.

At least one side face of each lamina is preferably provided with an opaque and preferably light reflecting coating, such as a thin metallic layer, of silver for example, or with a transparent coating of a material having a refractive index substantially different from that of the material of the lamina. Furthermore each lamina is preferably so shaped that light entering it through the first window and impinging on the periphery of the lamina is totally internally reflected at the periphery so as to impinge upon the second window; or, conversely, light entering the lamina at the second window and impinging on the periphery is totally internally reflected at the periphery so as to impinge upon the first window.

It is often convenient, particularly in the common cases, where the scale is not transparent but reflects light from the side adjacent the reading head, that each lamina be provided with a third window in its periphery so disposed that light may be so directed into it as to issue from the first window. Furthermore the first and third windows are then so disposed that light entering a lamina through the third window is caused to issue from the first window and to impinge upon the scale at such an angle to the normal of the scale that it is reflected from the scale at an equal but opposite angle to the normal to the scale, through the first window to the second window.

In the most elementary application of the invention, the pitch of the first windows is equal to the pitch of the scale divisions of the scale, and the first windows are separated by non-transmitting spacers. In this case the length in the direction of the scale of the first windows may be less than, equal to or greater than 180° of phase or one half of the pitch of the scale divisions, the spacers being of complementary length so that the combined length of one window and one spacer is equal to the pitch of the scale divisions.

The invention, however, is particularly applicable to the system of measurement of relative movement of two parts embodying a reading head of the type in which two or more groups of windows are presented to the scale, one group covering corresponding portions or phase-bands only of the pitches of the scale divisions, these phase bands being spaced at an integral number of pitches, and another group covering other similarly spaced complementary portions or phase-bands only of the scale divisions. Such measurement systems may conveniently be referred to as "polyphase" systems.

Reading heads of this type are known that comprise two or more photoelectric detectors so arranged that the several detectors are responsive to different phase bands of the scale. Methods are known (for example as described in Proc. I.E.E., Part B, November 1960, pp. 624–633) for converting the polyphase signals corresponding with the different phase bands of the scale into analogous or digital interpretations of fractions of a pitch of the relative positions or movements of the scale and reading head. In one known arrangement for reading such scales, the reading head comprises an optical grating similar to a diffraction grating, such as a bar and slit grating, the pitch of which is equal to the pitch of the divisions of the scale and the lines or bars of which lie in a plane parallel with and close to that of the scale but are inclined to the divisions of the scale, so that a "moire" pattern is produced, the photoelectric detectors being severally responsive to different parts of this "moire" pattern. In another known arrangement for securing this result, the reading head comprises a plurality of separate gratings, each having a pitch equal to that of the divisions of the scale, but spaced from one another along the scale by a distance equal to a quite large number of pitches plus or minus a spatial phase difference of less than 360°, a corresponding plurality of photoelectric detectors being severally responsive to light traversing different gratings. Both of these arrangements suffer from a disadvantage in that the several photoelectric detectors are responsive to light from different portions of the scale. Thus a defect in or on the scale, such for example as localized dirt thereon, may affect one detector only at any one time and thus cause an error of reading. Similarly uneven illumination of the scale may cause error in the reading. A further object of the present invention is to provide a reading head of the type set forth that does not suffer from the disadvantage referred to. In such prior arrangements, moreover, the reading head comprised a bar-and-slit type grating, which inherently entails that a large portion of the area of the reading head, generally about one half, does not transmit useful light. A still further object of the invention is to utilize more effectively than heretofore the total area of the reading head by minimizing the area occupied by non-active portions thereof, which non-active portions amount to at least one half of the area in such known reading heads.

In order to achieve these objects and to achieve other advantages, the invention includes the combination with a reading head as set forth wherein the stack of laminations of the reading head comprises groups of first windows, the median planes of these first windows of each group being spaced apart by integral multiples of the pitch of the scale divisions, each first window of each group cooperating with a spatial phase band of not greater than 360° on the scale, the first windows of one group being interleaved with those of another group or groups, so that immediately adjacent laminations of the several groups separately cooperate with different phase bands of the scale; and wherein separate external light transmission channels are associated one with all the second windows that correspond with the first windows of one group and another with the second windows that correspond with the first windows of another group, so as to transmit light from the scale to separate means for rendering light intensity appreciable, such as separate photoelectric cells and electrical indicating apparatus or separate areas of a visually observable translucent screen or screens, or so as to transmit light to the scale from differently distinctive, such as differently colored or alternatively operative, light sources. In a preferred example of this combination, the laminae are arranged transversely of the length of the scale and each lamina has one first window, and one second window each of these windows extending across the thickness of the lamina. In this case the thickness of each lamina may be, and preferably is, equal to half the length of the pitch of the scale divisions, the planes of the laminae being transverse to the length of the scale. For example in a case where two phases are to be employed, the thickness of each lamina would be equal to the length of 180° or one half of a pitch of the scale divisions, or, when for three phases, the thickness would be equal to the length of 120° or one third of a pitch of the scale divisions.

For the better understanding of the invention certain specific examples of it will now be described by way of example only with reference to the accompanying purely diagrammatic drawings in which.

Figure 11A:
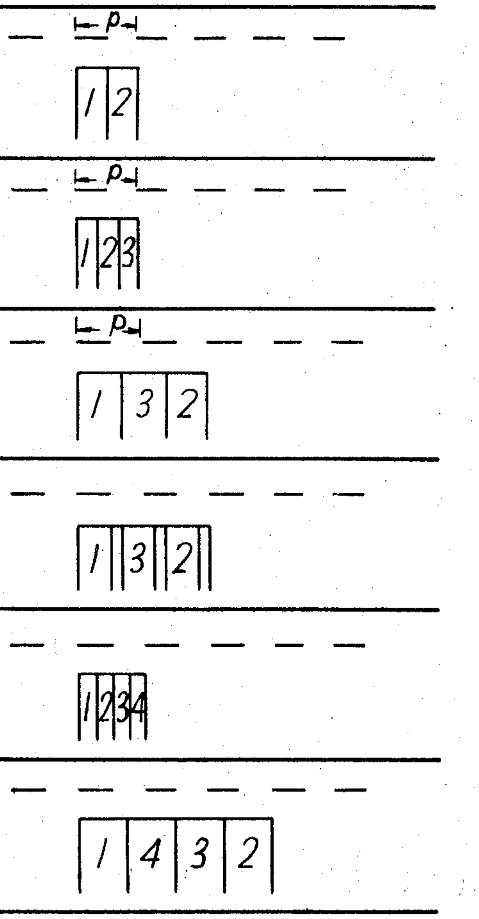

FIG. 11(a), FIG. 11(b) and FIG. 11(c) are charts illustrating the relationship between the number of separate phases of the reading head, the length of the action area of the reading head, the length of the individual first windows (or thickness of the laminae) and the length or thickness of any spacers that may be employed in terms of the pitch of the scale divisions and showing corresponding diagrammatic side elevations of the scale divisions and laminae.

Figure 1:
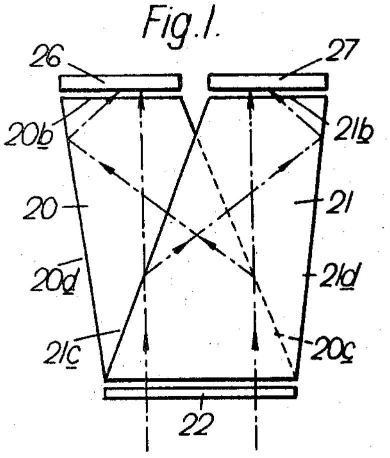
FIG. 1 is an end elevation of the essential parts of a two-phase reading head and transparent scale.
Figure 2:
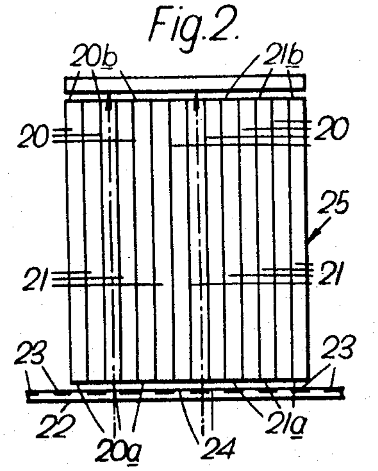
FIG. 2 is a side elevation of the reading head and scale shown in FIG. 1.

Referring now to FIGS. 1 and 2 of the accompanying drawings, the two-phase reading head illustrated cooperates with a light transmitting flat scale 22 having opaque scale divisions indicated at 23 uniformly pitched and spaced apart by translucent or transparent bands 24. The scale 22 may be attached to a moving part of a machine, such as a saddle or slide rest, for translational movement relatively to a reading head, indicated generally at 25, which may be mounted on a fixed part of the machine. The reading head 25 comprises two groups each of seven laminae, namely the laminae 20 and 21, each of which laminae consists of a transparent material such as glass or, preferably, a relatively resilient thermoplastic or thermosetting transparent synthetic resin. The thickness of each of the laminae 20 and 21 is equal to one half of the pitch or 180° of spatial phase of the scale divisions 23. The laminae of the two groups are interleaved and in contact with one another so that each lamina 20 of one group is adjacent a lamina 21 of another group, but are optically isolated from one another as by opaque and preferably light-reflecting coatings on their side faces, such as thin metallic layers, of silver for example, or by transparent coatings of material having a refractive index substantially different from that of the material of the laminae.

As shown in FIG. 1, the laminations 20 and 21 are trapezium shaped, and are preferably of identical shape and dimensions, the laminations 21 being reversed with respect to the laminations 20. The laminations 20 each have a first light transmitting window **20*a* and a second light transmitting window 20*b* which are constituted by opposite flat parallel and polished portions of the peripheral surface. Similarly the laminations 21 each have a first light transmitting window 21*a* and a second light transmitting window 21*b*. Of the remainder of the peripheries, the sides 20*c* and 21*c* of the laminae are flat and are inclined to the normals to the first windows 20*a* and 21*a* respectively so that light entering the windows 20*a* and 21*a* substantially normally thereto from the scale 22 is totally internally reflected so as to fall partly on the second windows 20*b* and 21*b* and partly on the flat sides 20*d* and 21*d*, which latter sides are at such an inclination to the normals to the first windows 20*a* and 21*a* that the light thus internally reflected at the sides 20*c* and 21*c* and impinging on the sides 20*d* and 21*d* is again totally internally reflected to the second windows 20*b* and 21*b*. Instead of, or as well as, the sides 20*c*, 20*d*, 21*c*, and 21*d* being so arranged as internally to reflect the light, they may be provided with opaque and preferably light-reflecting coatings. As indicated in FIGS. 1 and 2, separate external light transmission channels are associated respectively with the second windows 20*b* and 21*b*. These separate external light transmission channels in this case comprise small air-gaps between the windows 20*b* and 21*b* and means 26 and 27 for rendering light intensity appreciable. The means 26 and 27** may consist merely of translucent screens that may be observed visually; but they preferably consist of photo-responsive means, such as photo-electric cells connected with galvanometers.

In use, light, which may be collimated or not, is directed as indicated by arrows from any suitable light source upon the scale 22 and passes through the transparent bands between the opaque scale divisions 23 of the scale. The major portion of the light so directed is transmitted through the first windows **20*a* and 21*a* of the two groups of laminae to the second windows 20*b* and 21*b*, the intensity of light so passing to the respective windows being modulated in dependence upon the position of the respective windows 20*a* and 21*a* relatively to the scale divisions 23. Thus, as the windows 20*a* of group of laminae 20 moves uniformly relatively to the scale through one pitch or 360° of the scale, the light issuing from the window 20*b* varies from a maximum through a minimum to a maximum. Correspondingly the light issuing from the windows 21*b* varies similarly but with a spatial phase displacement (referred to the scale) of 180°. The light intensity appreciated by the means 26 therefore performs one complete cycle of alternation from a maximum to a minimum and back to a maximum again for every relative displacement of the reading head 25 and scale 22 by one complete pitch of the scale divisions, that is a spatial phase displacement of from 0° to 360°. Correspondingly the light intensity appreciated by the means 27 wanes from a maximum to a minimum and again waxes to a maximum in the course of relative displacement of from 180° to 540°. By counting the number of cycles of waxing and waning of the light falling on either of the means 26 and 27, the total number of scale division pitches through which the scale 22 and reading head 25 move relatively to one another, and a first approximation to the amount of relative movement is secured. By assessment of the differences in light intensities falling on the means 26 and 27 a substantially more accurate assessment of the extent of relative movement of the head 25 and scale 22** may be deduced.

Figure 3:
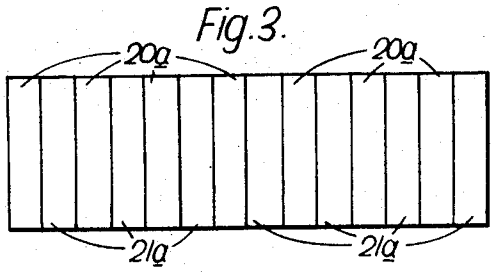
FIG. 3 is an inverted plan view on a larger scale of part of the face of the reading head shown in FIG. 1 and that is juxtaposed to the scale.
Figure 4:
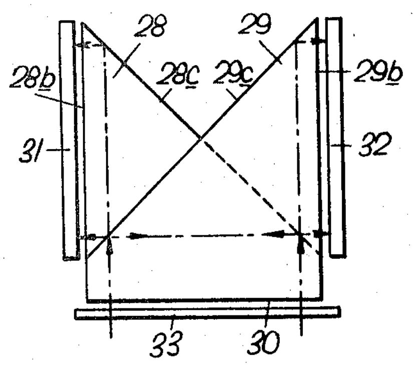
FIG. 4 is a wide elevation, similar to FIG. 1 of modification of the two-phase reading head of FIGS. 1 and 2.

In the arrangement diagrammatically shown in FIG. 4 the laminae are in the form of slightly truncated right-angled triangular prisms. Again the reading head comprises two groups of interleaved laminae 28 and 29 which are reversed with respect to one another. In each lamina the second window **28*b* or 29*b* is constituted by a flat peripheral portion that is perpendicular to the flat first window 30 and the main part of the remainder of the periphery is a flat surface 28*c* or 29*c* at 45° to the first and second windows respectively. In this arrangement the means for appreciating light-intensity 31 and 32 are located on opposite sides of the reading head and respectively receive the light from the first group of laminae 28 and the second group of laminae 29**. In other respects the arrangement is similar to that described with reference to FIGS. 1, 2 and 3.

In this case, collimated light from a light source, not shown, traverses the scale 33 and enters the first windows 30 of the two groups of laminae. The light so entering the laminae is totally internally reflected at the flat peripheral faces **28*c* and 29*c* to issue from the second windows 28*b* and 29*b* whence it falls on the means 31 and 32**.

Figure 5:
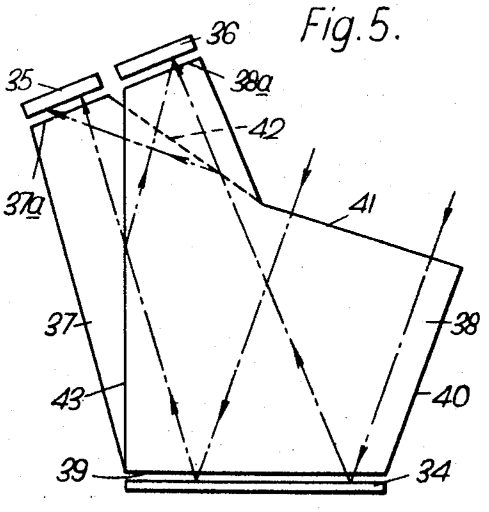
FIG. 5 is a cross-section, of a two phase reading head for use with an opaque, reflecting scale.

The arrangement shown in FIG. 5 utilizes an opaque reflecting scale 34. In this case the laminae take the form of re-entrant pentagonal prisms in order to provide for a third window for illuminating the scale 34 and for conveniently separating the means 35 and 36 for appreciating light intensity. In this case the laminations 37 and 38 are not identical.

Each of the laminations 37 and 38 has a first window 39, a peripheral side 40 extending from the window at a fairly small angle to the normal thereto and a third window 41, the normal to which makes a small angle with the normal to the window 39. To this extent the laminae 37 and 38 of the two groups are identical. The laminae 37, however, have a flat peripheral side portion 42, bounding a re-entrant angle at the side end of the third window 41, the side portion 42 being at such angles to the first window 39 and scale 34 that light admitted through the third window 41 and reflected from part of the scale 34 and impinging upon the portion 42 is totally internally reflected to the second window 35, which also receives light directly reflected from other parts of the scale 34 through the first window 39, as indicated by arrows in FIG. 5. Correspondingly, each lamina 38 has a flat peripheral side portion 43 which is at such an angle to the first window 39 that the light falling on part of the scale 34 from the third window 41 and reflected from the scale to impinge on the portion 43, is totally internally reflected to the second window **38*a*. Light falling on the other part of the scale 34 from the window 41 is directly reflected to the second window 38*a*.**

Figure 6:
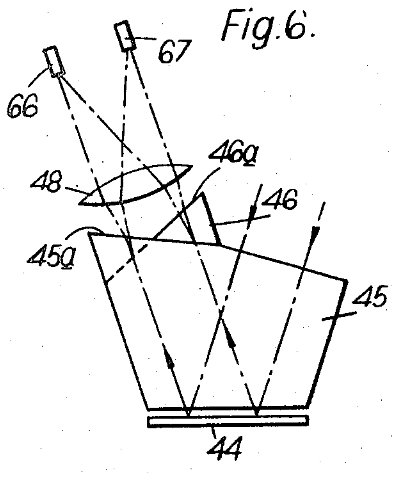
FIG. 6 is a cross-section of another arrangement for use with an opaque, reflective scale.

In the arrangement diagrammatically illustrated in FIG. 6 in which an opaque reflecting scale 44 is utilized, each lamina again has three windows, but the second windows **45*a* of one group of laminae 45 are inclined to the second windows 46*a* of the other group of laminae 46 so that the light issuing from the laminae of the two groups is differently refracted at the windows 45*a* and 46*a* to enter separate means 66 and 67** for rendering light intensity appreciable.

In the case illustrated in FIG. 6, a condensing lens 48 serves to collect the light from all the second windows **45*a* and 46*a* and to direct to the light-appreciating means 66 and 67**, respectively. The paths of the light are indicated by arrows in FIG. 6.

Figure 7:
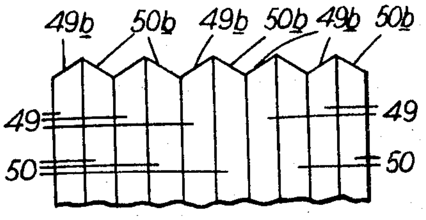
FIG. 7 is a part side elevation, showing the laminae only, of yet another two phase head for use with a transparent scale.

In FIG. 7 is indicated yet another manner of segregating the light from the second windows of the two groups of laminae of a two-phase reading head. In this case the second windows of the laminae are flat, those **49*b*, of the laminae 49 of one phase being inclined to the median planes of the laminae in one sense, while those, 50*b* of the laminae 50** are oppositely inclined to the median planes of the laminae, so that the light issuing from the two groups of laminae is separated in opposite directions into separate external paths.

Figure 8:
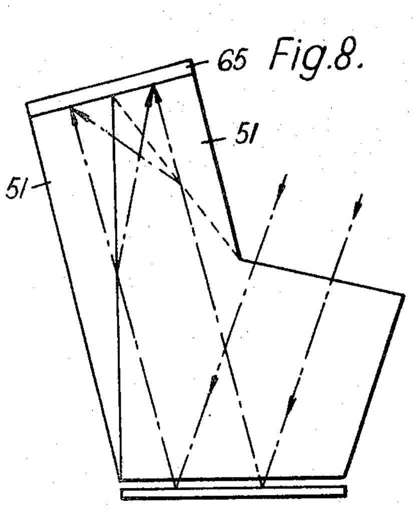
FIG. 8 is an end elevation of one form of two phase reading head for an opaque reflecting scale.
Figure 9:
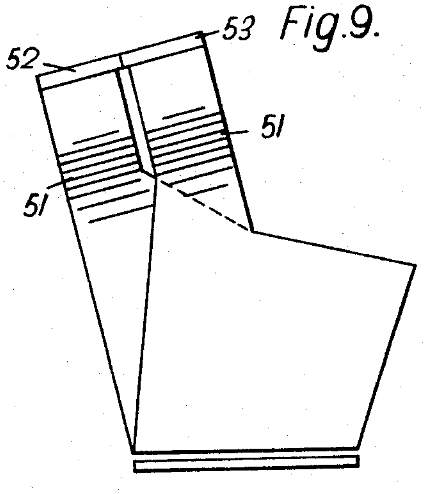
FIG. 9 is a similar end elevation of a modification of the head shown in FIG. 8.
Figure 10:
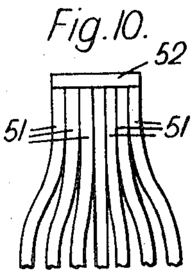
FIG. 10 is a side view of the part of the modification illustrated in FIG. 9.

In the arrangement illustrated diagrammatically in FIGS. 9 and 10, the laminae are shaped rather similarly to those in FIG. 5. In these cases, however, each lamina is provided with an extension 51 of the same thickness as the lamina itself. These extensions 51 may be, and preferably are, integral with the laminae and serve as what may be termed "light guides" confining the light by total internal reflection at their boundaries and thus ensuring its transmission from one end to the other, so that, in effect, the second windows of the laminae are at the free end of the extensions. The extensions 51 of each group of laminae being very thin and preferably of resilient material, may be readily bent and bunched together in bundles respectively for each group, the bunch corresponding to one group or phase cooperating with a light appreciating means 52 and the bunch corresponding with another group cooperating with another light appreciating means 53, as shown in FIGS. 9 and 10. Alternatively, as shown in FIG. 8, a simple ground glass or similar translucent screen 65 may cooperate with all the bundles of laminae.

The arrangements described with reference to and illustrated in FIGS. 1 to 10 inclusive are all two-phase arrangements. However, by utilizing more groups of interleaved laminae numerous other members of phases and different phase-sequences may be utilized. FIG. 11 (*a*), (*b*), and (*c*) is a chart demonstrating a number of such possible arrangements.

In FIG. 11 the figures in the column headed *n* are the number of phases, and consequently the number of groups of laminae employed. The column headed R gives the minimum length of the stack of laminations of the reading head in terms of pitch P of the divisions of the scale, this minimum length of the stack of laminations may, of course, be increased by any integral multiplier. The column headed *l* gives the length of the first windows or thickness of the laminae in terms of the pitch P of the scale divisions. In some cases it is desirable that opaque, or alternative non-light transmitting spacers be interposed between adjacent laminae. Thus the laminae of one group, while adjacent to the laminae of another group, may be spaced therefrom by the thickness of the spacers. The column headed *s* gives the length or thickness of any such spacers. The right-hand column illustrates diagrammatically the arrangement of laminae, spacers, and scale, the phases of the respective groups of laminae being indicated by numbers 1, 2, 3, etc.

It is thought that no further explanation of the chart of FIG. 11 (*a*), (*b*) and (*c*) is needed.

It will be appreciated that certain particular manners of carrying out the invention have been described in some detail with reference to the accompanying drawings, and that many modifications may be made without departing from the scope of the invention.

What we claim is:

1. In combination with a measuring scale having scale divisions at a predetermined pitch, a reading head comprising a stack of a plurality of groups of parallel-sided optically isolated transparent laminae, each lamina of each group having in its periphery at least a first light-transmitting window juxtaposed to the scale and a second light-transmitting window, the median planes of the first windows being spaced apart by integral multiples of the pitch of the scale divisions, the laminae of the groups being so interleaved with one another that any lamina of any one group is adjacent to a lamina of another group, the second light-transmitting windows of each group of laminae opening on a common area separate from the common area of another group and being offset relatively to each other so that the paths of light beams passing between the first and second light-transmitting windows of respective groups of laminae are, externally of the laminae, segregated from one another, and the laminae of all the groups being such that a light beam passing through one of said first and second light-transmitting windows also passes through the other of said first and second light-transmitting windows, illuminating means for causing light to be propagated through the first and second light-transmitting windows of all the groups of laminae via the scale and means at each said common area for comparing the relative intensities of light so propagated through one group of laminae with that so propagated through another group of laminae.

2. The combination claimed in claim 1 wherein the median planes of the laminae of each group are spaced apart by integral multiples of the pitch of the scale divisions.

3. The combination according to claim 1 wherein at least one side of each lamina is provided with an opaque coating.

4. The combination according to claim 1 wherein at least one side of each lamina is provided with a light-reflecting coating.

5. The combination according to claim 1 wherein at least one side of each lamina is provided with a coating of a material having a refractive index different from that of the material of the lamina.

6. The combination according to claim 1 wherein each of said lamina is so shaped that light entering it at one of said transmitting windows and impinging on the periphery of the lamina is so totally internally reflected at the periphery as to impinge upon the other of said light-transmitting windows.

7. The combination according to claim 6 wherein recurrent scale divisions are relatively transparent and intermediate scale divisions are relatively light attenuating.

8. In combination with a measuring scale having scale divisions at a predetermined pitch and constituted by relatively optically reflecting and non-reflecting bands, a reading head comprising a stack of a plurality of groups of optically isolated transparent laminae, the laminae of the several groups being so interleaved with one another that any lamina of one group is adjacent to a lamina of another group, each lamina of each group having in its periphery at least a first light-transmitting window juxtaposed to the scale, a second light-transmitting window and a third light-transmitting window, and each said lamina having a peripheral shape such that light entering through said third light-transmitting window emerges therefrom through the first light-transmitting window so as to illuminate said scale, and such that light reflected by said scale into the first light-transmitting window emerges through the second light-transmitting window, the second light-transmitting windows of each group opening on a common area separate from the common area of another group and being offset relatively to each other so that the paths of light reflected by said scale into the first light-transmitting windows and emerging through the second light-transmitting windows of respective groups of laminae are, externally of the laminae and beyond the second light-transmitting windows, spaced apart and segregated from one another, the median planes of the laminae of each group being spaced apart by integral multiples of the pitch of the scale division, means for illuminating said third light-transmitting windows and means at each said common area for comparing the intensities of light beams issuing from the second light-transmitting windows of each group of laminae.

9. For measuring relative movement, apparatus comprising a reading head having two sets of transparent laminae arranged in parallel adjacency with the laminae of one set alternating with the laminae of the other set, a group of entrant windows extending along the edges of the laminae at one side of said head, two groups of emergent windows extending along the edges of the laminae in opposition to the entrant windows to receive light from the entrant windows, each of the two groups of emergent windows opening on a common area separate from the common area of the other group and being offset from each other selectively to receive light through said sets respectively, and a scale movable along a predetermined path over the entrant windows transversely of the laminae, the scale having alternate transmitting and non-transmitting portions extending transversely of said path, the width of said portions being substantially equal to the thickness of said laminae so that in certain positions of the scale along said path light may be transmitted through one set of laminae to one group of emergent windows and in alternate positions along said path light may be transmitted through the other set of laminae to the other group of emergent windows.

10. Apparatus according to claim 9 wherein said transmitting portions are transparent and said non-transmitting portions are opaque.

11. Apparatus according to claim 10 wherein the emergent windows are on the side of said head opposite to said entrant side.

12. Apparatus according to claim 10 wherein the emergent windows are on the opposite sides of said head adjacent to said entrant side.

13. Apparatus according to claim 9 wherein said transmitting portions are reflecting and said non-transmitting portions are non-reflecting.

14. Apparatus according to claim 13 wherein the emergent windows are on said side of the head.

15. The combination according to claim 1 wherein non-light transmitting spacers are interposed between adjacent laminae.

16. The combination according to claim 8 wherein non-light transmitting spacers are interposed between adjacent laminae.

References Cited by the Examiner

UNITED STATES PATENTS

| | | | |
|---|---|---|---|
| 2,471,800 | 5/1949 | Mulinen. | |
| 2,883,649 | 4/1959 | King | 250—227 X |
| 3,043,179 | 7/1962 | Dunn | 88—1 |
| 3,060,806 | 10/1962 | Lewis et al. | 88—1 X |

FOREIGN PATENTS

| | | |
|---|---|---|
| 198,586 | 6/1923 | Great Britain. |

OTHER REFERENCES

Gundert et al.: German application 1,092,955, printed Nov. 17, 1960, 2 pages spec., 1 sheet dwg.

JEWELL H. PEDERSEN, *Primary Examiner.*

J. K. CORBIN, *Assistant Examiner.*